United States Patent
Tseng et al.

(10) Patent No.: US 11,771,217 B2
(45) Date of Patent: Oct. 3, 2023

(54) SLIDING TABLE

(71) Applicant: TOYO AUTOMATION CO., LTD., Tainan (TW)

(72) Inventors: Kun-Cheng Tseng, Tainan (TW); Ming-Chi Su, Tainan (CN)

(73) Assignee: Toyo Automation Co., Ltd., Tainan (TW)

( * ) Notice: Subject to any disclaimer, the term of this patent is extended or adjusted under 35 U.S.C. 154(b) by 31 days.

(21) Appl. No.: 17/484,245

(22) Filed: Sep. 24, 2021

(65) Prior Publication Data
US 2022/0346546 A1 Nov. 3, 2022

(30) Foreign Application Priority Data
May 3, 2021 (TW) ................................. 110115904

(51) Int. Cl.
*B23Q 1/58* (2006.01)
*A47B 13/08* (2006.01)
*B23Q 1/46* (2006.01)

(52) U.S. Cl.
CPC .............. *A47B 13/081* (2013.01); *B23Q 1/58* (2013.01); *B23Q 1/46* (2013.01)

(58) Field of Classification Search
CPC .... F16C 29/0626; F16C 29/005; F16C 29/04; F16C 29/06; F16C 29/0614; F16C 29/0619; F16C 29/0607; F16C 33/4605; F16C 33/4611; F16C 33/56; F16H 2025/204; F16H 2025/2271; F16H 2025/2276; F16H 2025/2436; F16H 25/2214; F16H 25/2247

USPC ................ 384/43, 44, 45; 269/60; 108/20; 248/548

See application file for complete search history.

(56) References Cited

U.S. PATENT DOCUMENTS

| | | | | |
|---|---|---|---|---|
| 5,431,498 A * | 7/1995 | Lyon | ...................... | F16C 33/60 384/45 |
| 6,116,783 A * | 9/2000 | Shirai | ................. | F16C 33/3825 384/43 |
| 6,619,846 B1 * | 9/2003 | Nagai | ................... | F16C 29/005 384/43 |
| 7,798,718 B2 * | 9/2010 | Matsumoto | ......... | F16C 33/3825 384/54 |
| 9,074,624 B2 * | 7/2015 | Horie | ..................... | F16C 29/045 |
| 9,464,704 B2 * | 10/2016 | Mori | ................... | F16H 25/2214 |
| 11,268,600 B2 * | 3/2022 | Homma | ............... | F16C 29/004 |

(Continued)

FOREIGN PATENT DOCUMENTS

| | | | | |
|---|---|---|---|---|
| DE | 202013104521 U1 * | 12/2013 | ............ | F16C 29/048 |
| EP | 0707922 A1 * | 4/1996 | ............... | B23Q 1/26 |
| EP | 0838601 A1 * | 4/1998 | ............... | F16C 29/06 |

*Primary Examiner* — T. Scott Fix
(74) *Attorney, Agent, or Firm* — Rosenberg, Klein & Lee

(57) ABSTRACT

A sliding table includes a sliding seat having a seat body made from a first material and disposed between two main rigid rails parallel with each other. The seat body has two opposite rail recesses opening toward the main rigid rails, and two inner cyclic track holes disposed between the rail recesses. Two seat body rigid rails made from a second material harder than the first material are fixed in the rail recesses to confront the main rigid rails. Two roller belt modules are arranged in two cyclic track members overmolded to the seat body. When the seat body moves along the main rigid rails, each roller belt module circulates along one of the cyclic track members.

8 Claims, 10 Drawing Sheets

(56) References Cited

U.S. PATENT DOCUMENTS

| | | | | |
|---|---|---|---|---|
| 2002/0067869 A1* | 6/2002 | Michioka | ............ | F16C 29/0642 |
| | | | | 384/45 |
| 2002/0144561 A1* | 10/2002 | Nagai | ...................... | F16C 29/06 |
| | | | | 74/89.33 |
| 2002/0164095 A1* | 11/2002 | Nagai | ...................... | F16C 29/04 |
| | | | | 74/424.81 |
| 2003/0161557 A1* | 8/2003 | Ishihara | ................ | F16C 29/005 |
| | | | | 384/15 |
| 2004/0216543 A1* | 11/2004 | Nagai | ................... | F16C 29/005 |
| | | | | 74/89.33 |
| 2006/0232141 A1* | 10/2006 | Teramachi | ............ | F16C 29/063 |
| | | | | 310/12.21 |
| 2007/0147714 A1* | 6/2007 | Matsumoto | ......... | F16C 29/0647 |
| | | | | 384/45 |
| 2010/0139426 A1* | 6/2010 | Mori | ...................... | F16C 33/60 |
| | | | | 74/89.32 |
| 2018/0355959 A1* | 12/2018 | Homma | .................. | F16C 29/06 |

* cited by examiner

SLIDING TABLE

CROSS-REFERENCE TO RELATED APPLICATION

This application claims priority to Taiwanese Patent Application No. 110115904, filed on May 3, 2021.

FIELD

The disclosure relates to a sliding table of an automated device, and more particularly to a slidable composite seat body having two seat body rigid rails made from a material harder than the material of the seat body.

BACKGROUND

With the development of technology, various processing methods are automated by using a sliding table. The sliding table can perform a variety of tasks, such as feeding, cutting, milling, and finishing processing. The performance of the sliding table directly affects the range of applicability of the sliding table. A sliding table with high precision and smooth operation can accomplish tasks that require precise control. On the contrary, a sliding table with low accuracy and unstable motion is hardly acceptable for use in an automated method or device. Therefore, the goal of manufacturing and designing a sliding table is to improve precision and operational smoothness of the sliding table. In addition, in consideration of reduction of equipment costs, a sliding device with a better cost performance ratio and a longer service life tends to be favored by consumers.

SUMMARY

Therefore, the object of the disclosure is to provide a sliding table that is cost-saving, durable and long-lasting.

According to this disclosure, a sliding table includes two main rigid rails, a screw rod, and a sliding seat.

The two main rigid rails extend along a lengthwise direction of the sliding table and are parallel with each other.

The screw rod extends along the lengthwise direction and is disposed between the main rigid rails.

The siding seat includes a seat body, two seat body rigid rails, two cyclic track members, and two roller belt modules.

The seat body is made from a first material and disposed between the main rigid rails. The seat body has a driving hole through which the screw rod extends, two opposite sides respectively formed with rail recesses which open respectively toward the main rigid rails, and two inner cyclic track holes each of which is disposed between the driving hole and one of the rail recesses.

The seat body rigid rails are made from a second material harder than the first material, and are respectively fixed in the rail recesses to respectively confront the main rigid rails.

The cyclic track members are overmolded to the seat body. Each of the cyclic track members has an outer track section extending along one of the rail recesses and uncovering one of the seat body rigid rails fixed to the respective one of the rail recesses, an inner track section formed in one of the inner cyclic track holes, and two turnaround sections respectively disposed at two opposite ends of the outer track section. Each of the turnaround sections connects between one of the two opposite ends of the outer track section and one of two opposite ends of the inner track section.

The roller belt modules are respectively arranged in the cyclic track members. Each of the roller belt modules includes a belt made of a flexible material, and a plurality of rollers held by the belt at intervals.

When the seat body moves along the main rigid rails, each of the roller belt modules circulates along one of the cyclic track members by sequentially passing the outer track section, one of the turnaround sections, the inner track section, and the other one of the turnaround sections of the respective one of the cyclic track members.

The rollers of each of the roller belt modules roll between one of the main rigid rails and one of the seat body rigid rails, while the belt of each of the roller belt modules slides along the outer track section of one of the cyclic track members.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
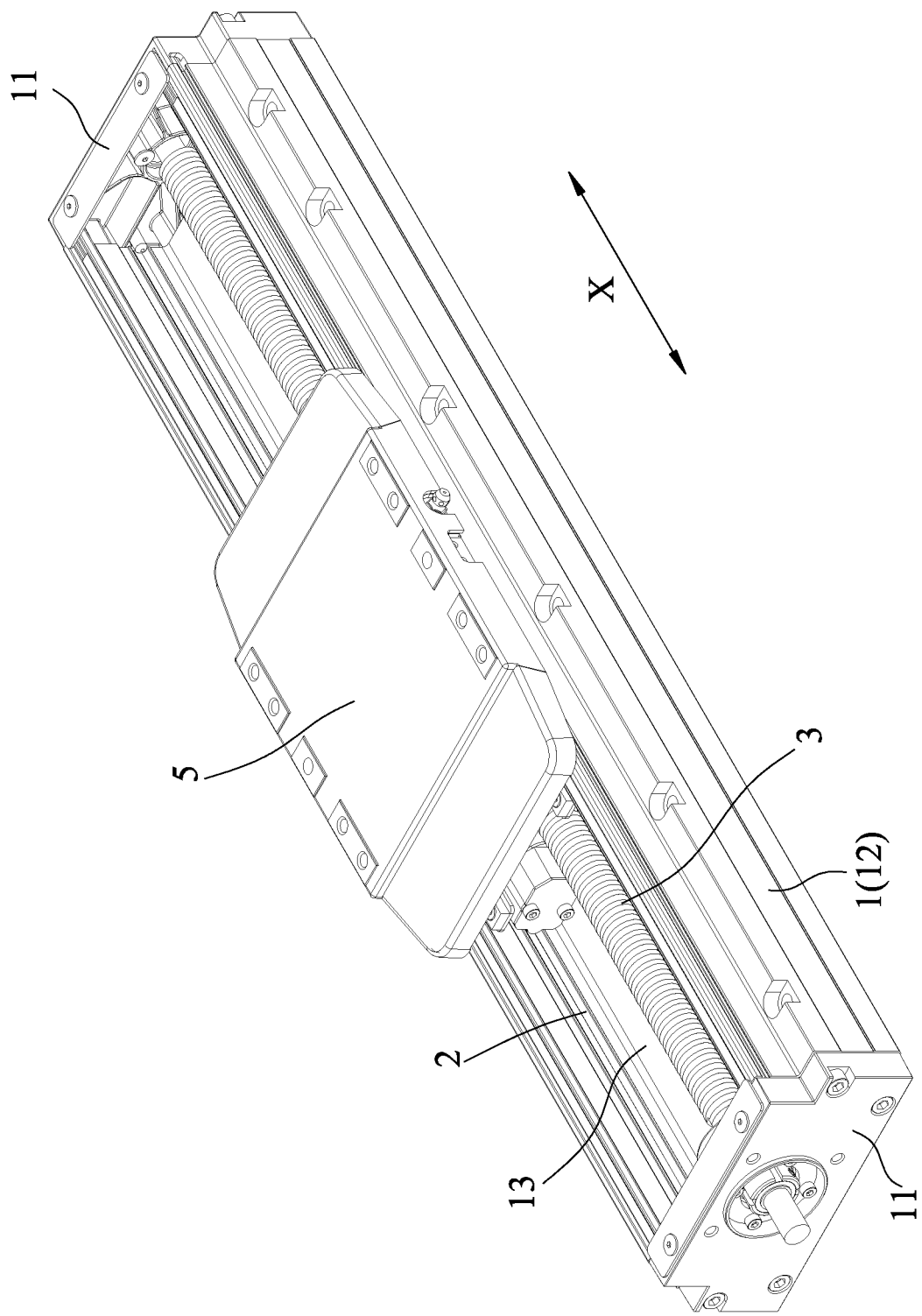
FIG. 1 is a perspective view of a sliding table according to an embodiment of the disclosure.
Figure 2:
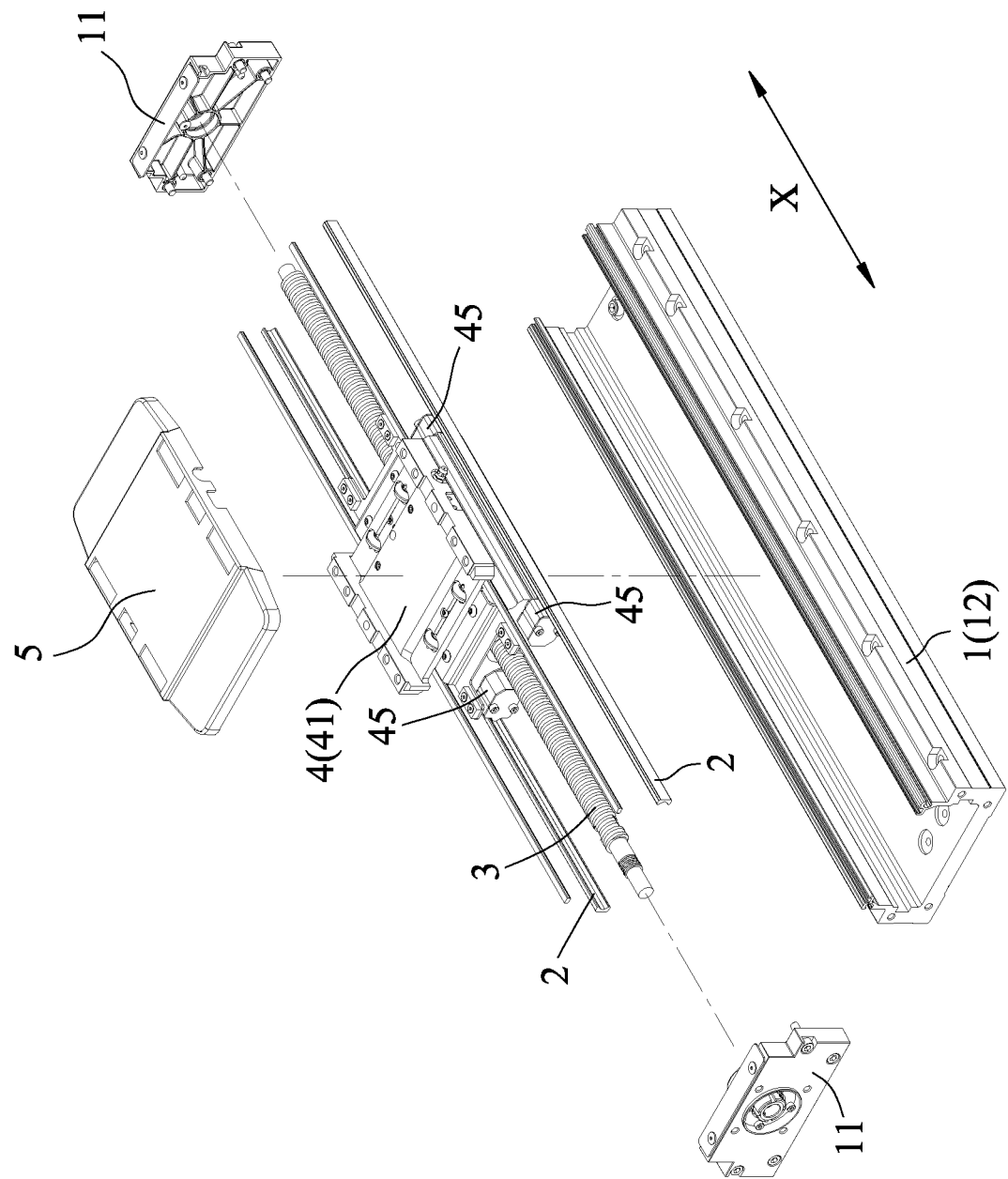
FIG. 2 is an exploded perspective view of the embodiment.

FIGS. 1 and 2 illustrate a sliding table according to an embodiment of the disclosure. The sliding table includes a base 1, two main rigid rails 2, a screw rod 3, a sliding seat 4, and a top cover 5.

The base 1 includes two end members 11 spaced apart from each other along a lengthwise direction (X) of the sliding table, and a main body 12 connected between the end members 11 and extending along the lengthwise direction (X). The end members 11 and the main body 12 cooperating with each other to define a main body space 13 opening upwardly.

The main rigid rails 2 are mounted within the main body space 13 and connected between the end members 11. The main rigid rails 2 extend along the lengthwise direction (X) and are parallel with each other.

The screw rod 3 extends along the lengthwise direction (X), is disposed between the main rigid rails 2, and is connected between the end members 11.

Figure 3:
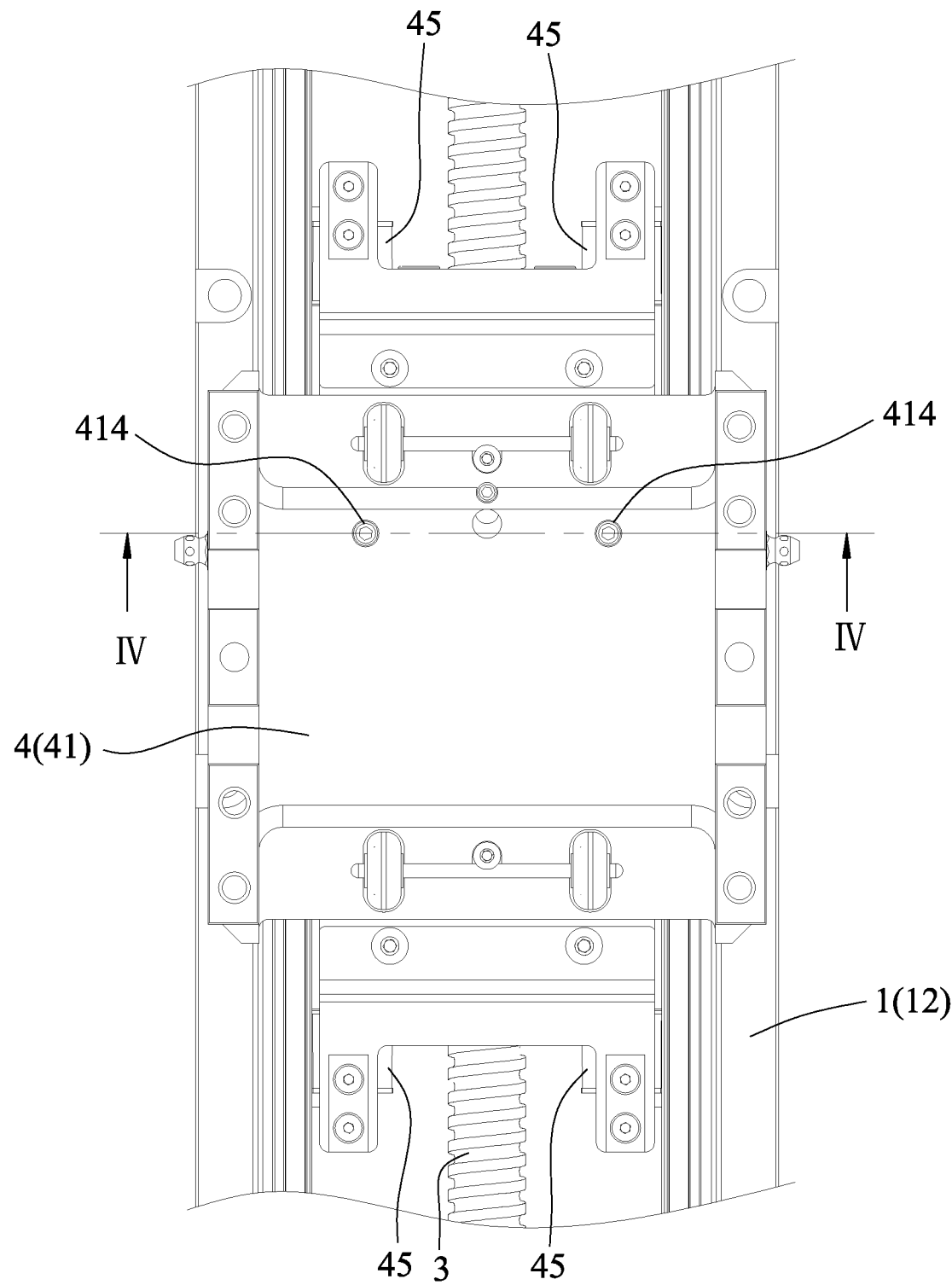
FIG. 3 is a top view of the embodiment illustrating a base, main rigid rails, a screw rod and a sliding seat of the sliding table.
Figure 4:
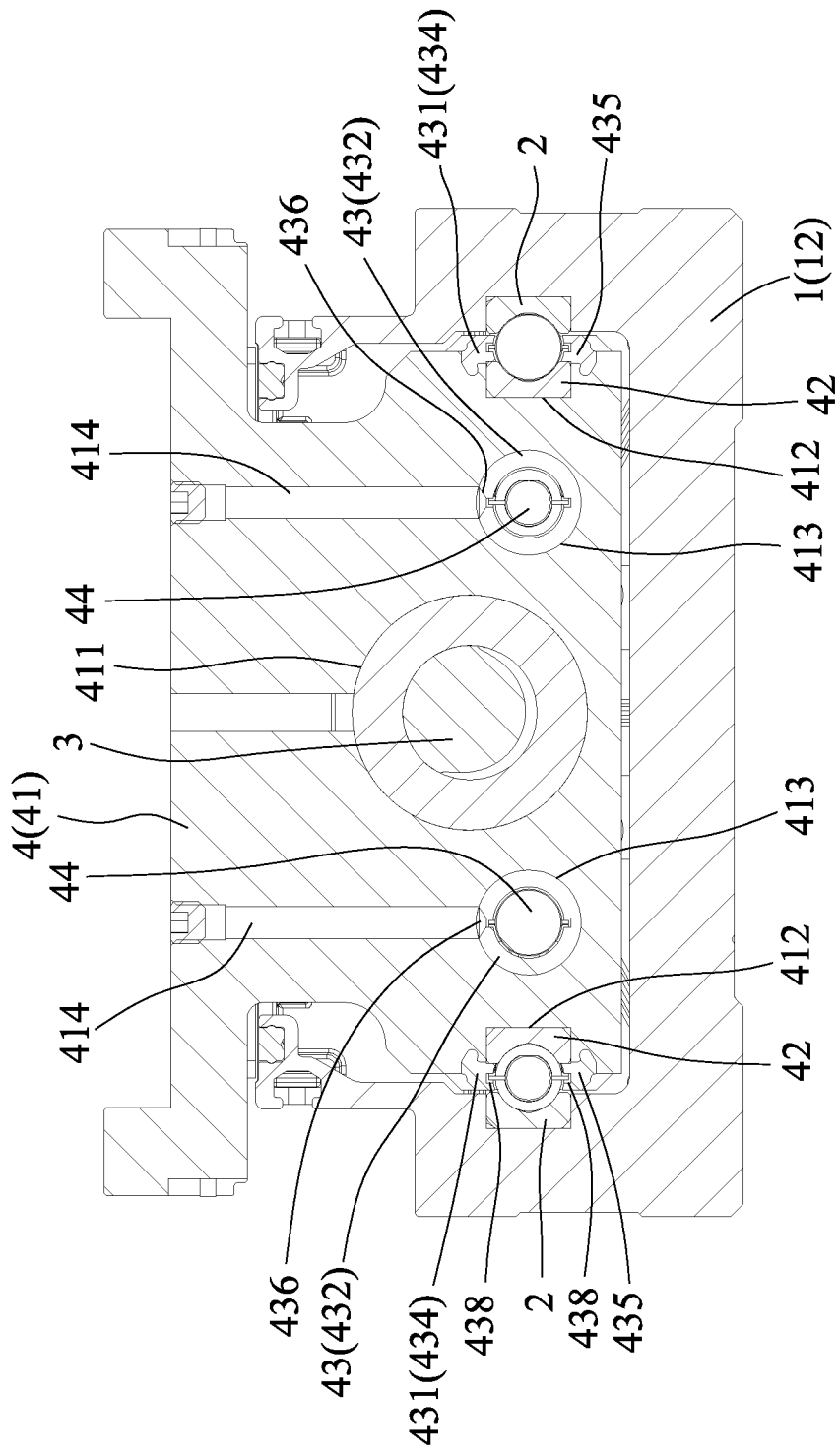
FIG. 4 is a sectional view taken along line IV-IV of FIG. 3.
Figure 5:
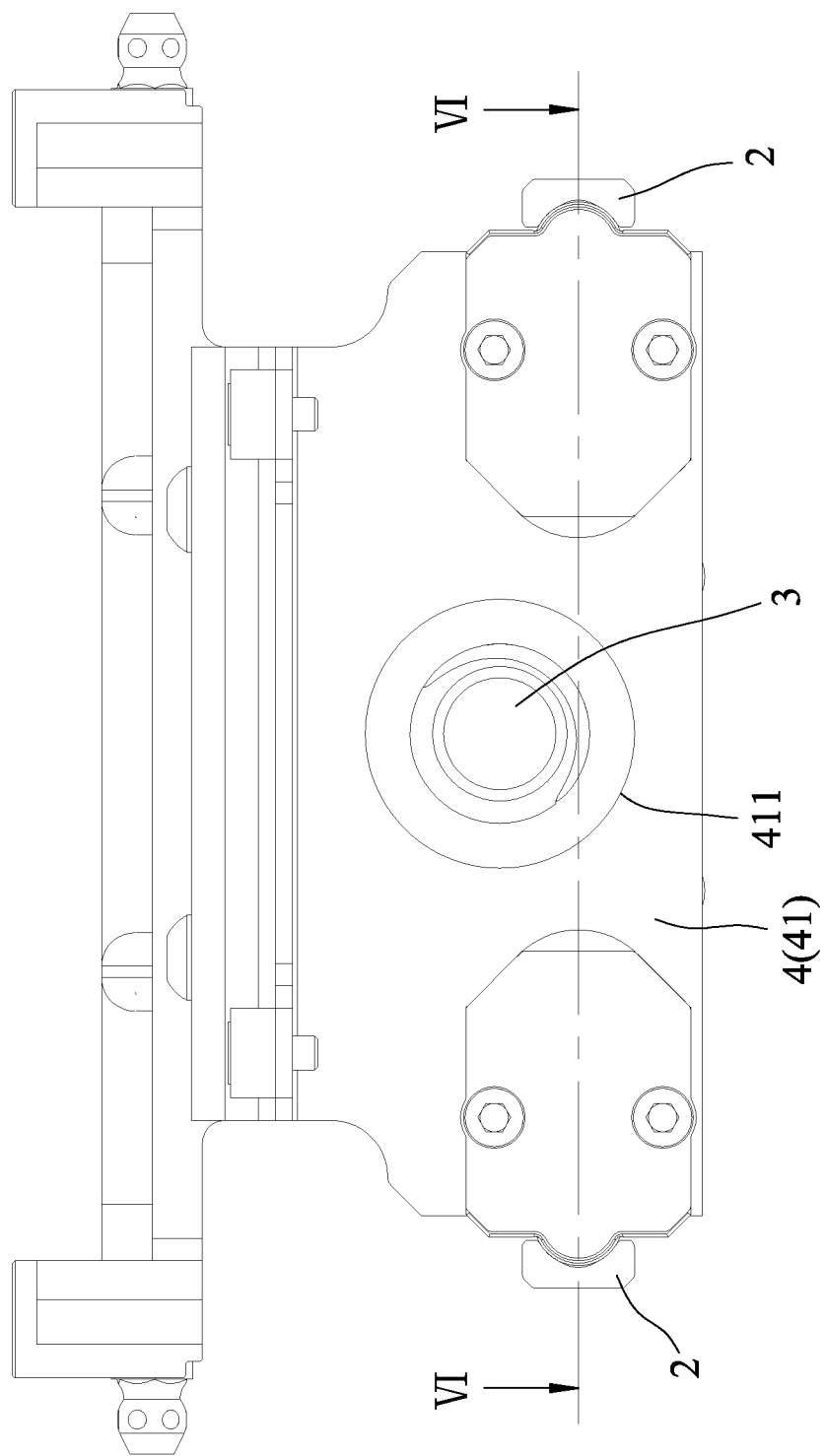
FIG. 5 is a front view of the embodiment illustrating the main rigid rails, the screw rod, and the sliding seat.

Referring to FIGS. 3 and 4, the sliding seat 4 includes a seat body 41, two seat body rigid rails 42, two cyclic track members 43, two roller belt modules 44, and four track covers 45.

The seat body 41 is made from a first material and disposed slidably between the main rigid rails 2. The seat body 41 has a driving hole 411 through which the screw rod 3 extends, two opposite sides respectively formed with rail recesses 412 which open respectively toward the main rigid rails 2, two inner cyclic track holes 413 each of which is disposed between the driving hole 411 and one of the rail recesses 412, and two oil injecting passages 414 respectively extending to the inner track holes 413. In this embodiment, the first material is aluminum, and the seat body 41 is an extruded aluminum body.

The seat body rigid rails 42 are made from a second material harder than the first material, and respectively fixed in the rail recesses 412 to respectively confront the main rigid rails 2. In this embodiment, the second material is steel, and the seat body rigid rails 42 are respectively adhered to the rail recesses 412 by thread-locking adhesives.

Although the cost of aluminum is lower than that of steel, steel is more resistant to wear and tear. Because the seat body 41 is made from aluminum, material costs can be effectively reduced while the seat body rigid rails 42 fixed in the rail recesses 412 can effectively resist wear and tear to avoid deformation and to increase service life.

The cyclic track members 43 are made from a plastic material and are overmolded to the seat body 41. As shown in FIGS. 5 to 8, each of the cyclic track members 43 has an outer track section 431 extending along one of the rail recesses 412 and uncovering one of the seat body rigid rails 42 fixed to the respective rail recess 412, an inner track section 432 formed in one of the inner cyclic track holes 413, and two turnaround sections 433 respectively disposed at two opposite ends of the outer track section 431. Each of the turnaround sections 433 connects between one of the two opposite ends of the outer track section 431 and one of two opposite ends of the inner track section 432.

The outer track section 431 of each of cyclic track members 43 has a top engagement bar 434 and a bottom engagement bar 435 that are respectively formed at upper and lower sides of the respective rail recess 412. Each of the top and bottom engagement bars 434, 435 connects between the two turnaround sections 433 (see FIG. 8). One of the seat body rigid rails 42 is exposed between the top and bottom engagement bars 434, 435. The inner track section 432 of each of the cyclic track members 43 is in the form of a tube and has an oil injecting hole 436 extending radially through inner and outer surfaces of the tube. The oil injecting holes 436 of the cyclic track members 43 respectively communicate the oil injecting passages 414, and the oil injecting passages 414 extend to a top of the seat body 41 from the respective oil injecting holes 436 through the respective inner track holes 413. Therefore, lubricant can be injected into the oil injecting passages from the top of the seat body 41 and through the oil injecting holes 436 to flow into the tube of the inner track sections 432 of the cyclic track members 43.

Figure 6:
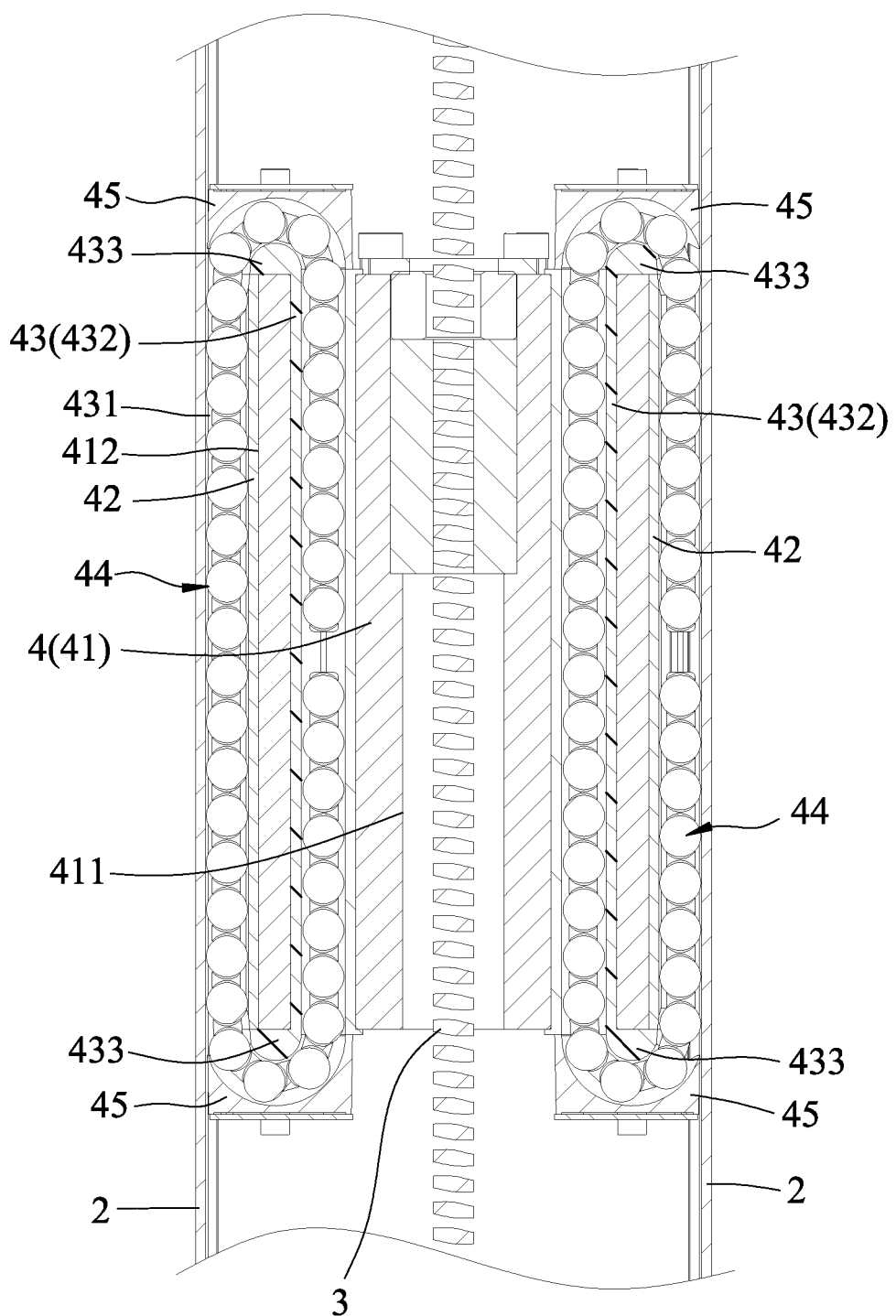
FIG. 6 is a sectional view taken along line VI-VI of FIG. 5.
Figure 7:
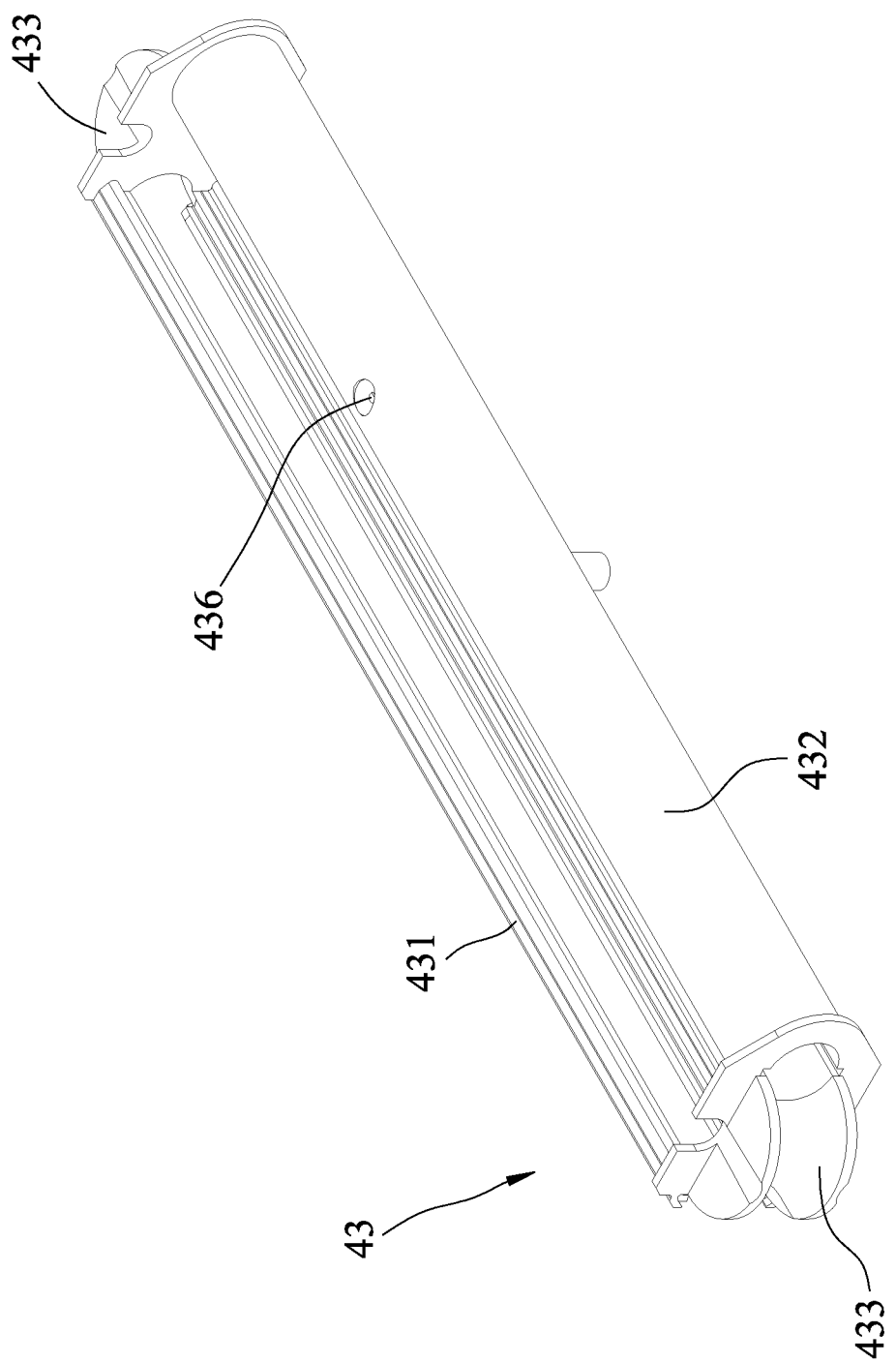
FIG. 7 is a perspective view of the embodiment illustrating a cyclic track member of the sliding table.
Figure 8:
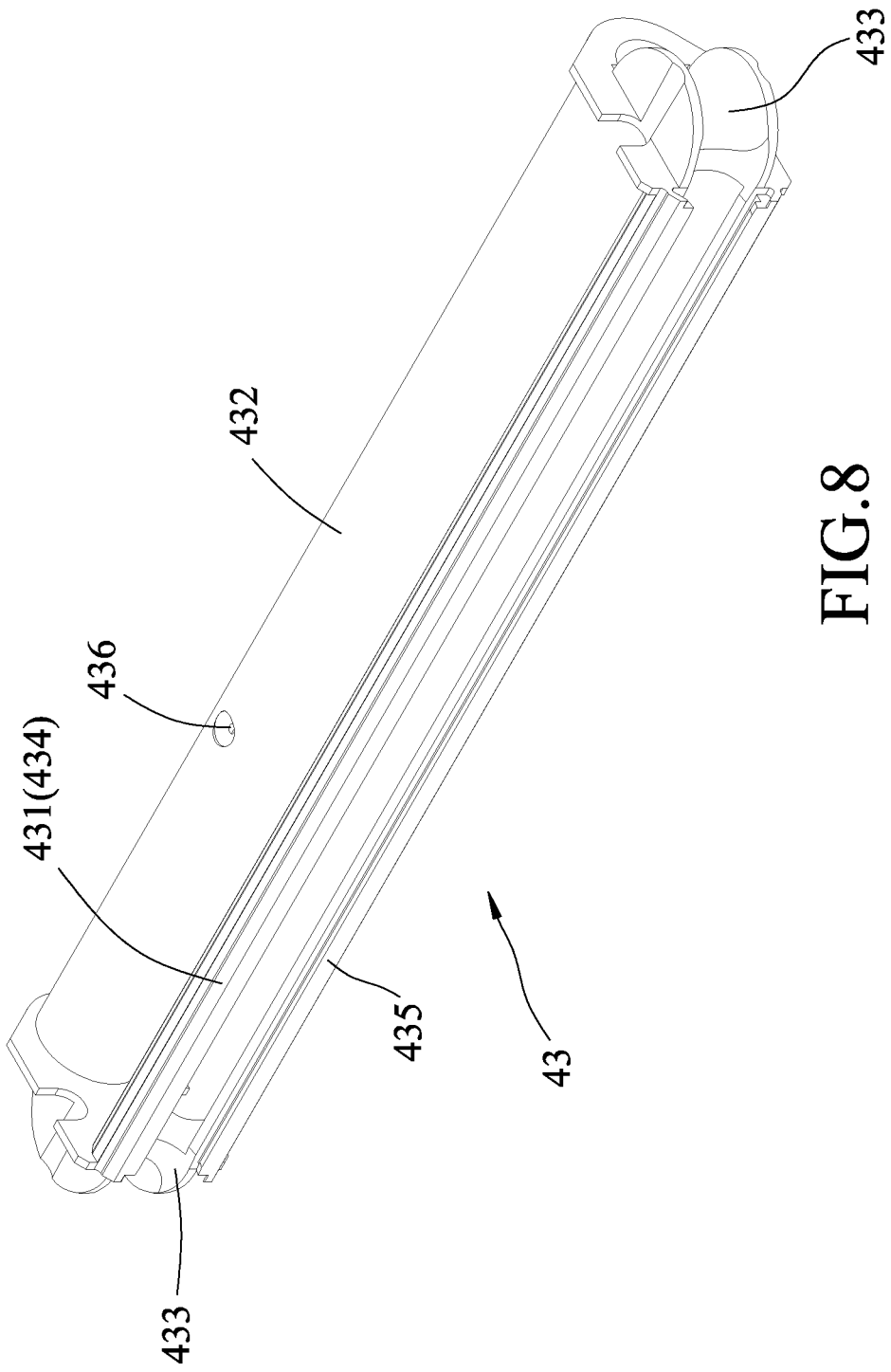
FIG. 8 is another perspective view of the cyclic track member viewed from another angle.
Figure 9:
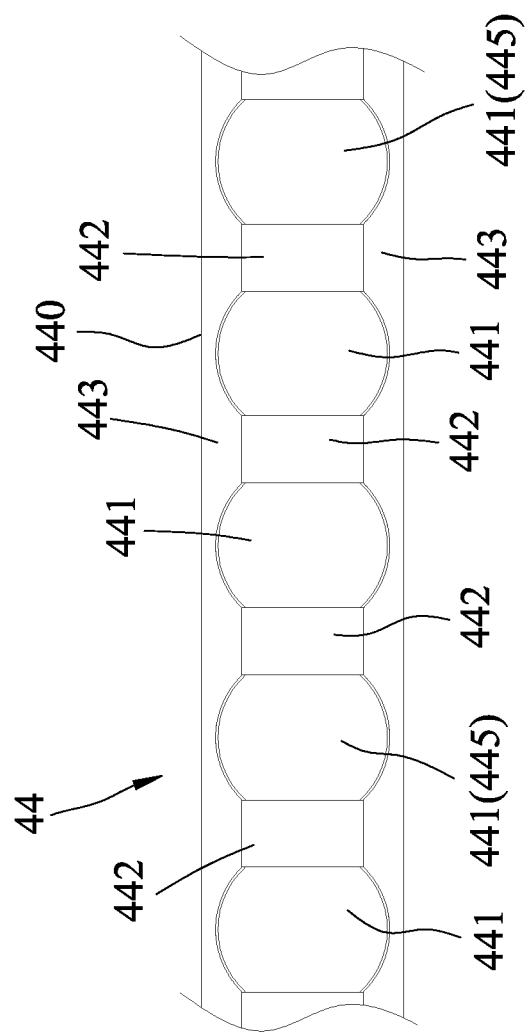
FIG. 9 is a side view of the embodiment illustrating a roller belt module of the sliding table.

Referring to FIGS. 6 and 9 in combination with FIG. 4, the roller belt modules 44 are respectively arranged in the cyclic track members 43. Each of the roller belt modules 44 includes a belt 440 made of a flexible material, and a plurality of rollers 441 held by the belt 440 at intervals. The belt 440 of each of the roller belt modules 44 has top and bottom longitudinal strip parts 443, a plurality of spacer parts 442 disposed at intervals and connecting between the top and bottom longitudinal strip parts 443, and a plurality of ball cavities 445 each of which is defined between two adjacent ones of the spacer parts 442 and between the top and bottom longitudinal strip parts 443 to receive one of the balls 441.

When the seat body 4 moves along the main rigid rails 2, each of the roller belt modules 44 circulates along one of the cyclic track members 43 by sequentially passing the outer track section 431, one of the turnaround sections 433, the inner track section 432, and the other one of the turnaround sections 433. The rollers 441 of each of the roller belt modules 44 roll between one of the main rigid rails 2 and one of the seat body rigid rails 42, while the belt 440 of each of the roller belt modules 44 slides along the outer track section 431 of one of the cyclic track members 43. The belt 440 of each of the roller belt modules 44 is in sliding engagement with the top and bottom engagement bars 434, 435 of the outer track section 431 of one of the cyclic track members 43. During circulation of each roller belt module 44 in the respective cyclic track member 43, the rollers 441 in the outer track section 431, which are in abutment with the respective main rigid rail 2 and the respective seat body rigid rail 42, are forced to slide and roll while the top and bottom longitudinal strip parts 443 respectively and slidably engaging slide grooves 438 (see FIG. 4) of the top engagement bar 434 and the bottom engagement bar 435. In such a manner, each roller belt module 44 can be properly and stably placed in the respective outer track section 431 and smooth sliding and rolling of the rollers 441 can be ensured.

Noteworthily, when the rollers 441 of each roller belt module 44 travel in the outer track section 431 of the respective cyclic track member 43, they are close to each other due to the forces exerted by the respective main rigid rail 2 and the respective seat body rigid rail 42. When the rollers 441 travel in the inner track section 432 of the respective cyclic track member 43, they become loose and allow a lubricant oil to be easily and thoroughly applied to the roller belt module 44. By virtue of the circulation of each roller belt module 44, the lubricant oil can be uniformly spread throughout the roller belt module 44, thereby increasing the lubricating effect.

As shown in FIGS. 2, 3 and 6, the track covers 45 respectively cover the turnaround sections 433 of the cyclic track members 43 to prevent escape of the rollers 441 from the belts 440 of the roller belt modules 44.

As shown in FIGS. 1 and 2, the top cover 5 covers a top of the seat body 41.

Figure 10:
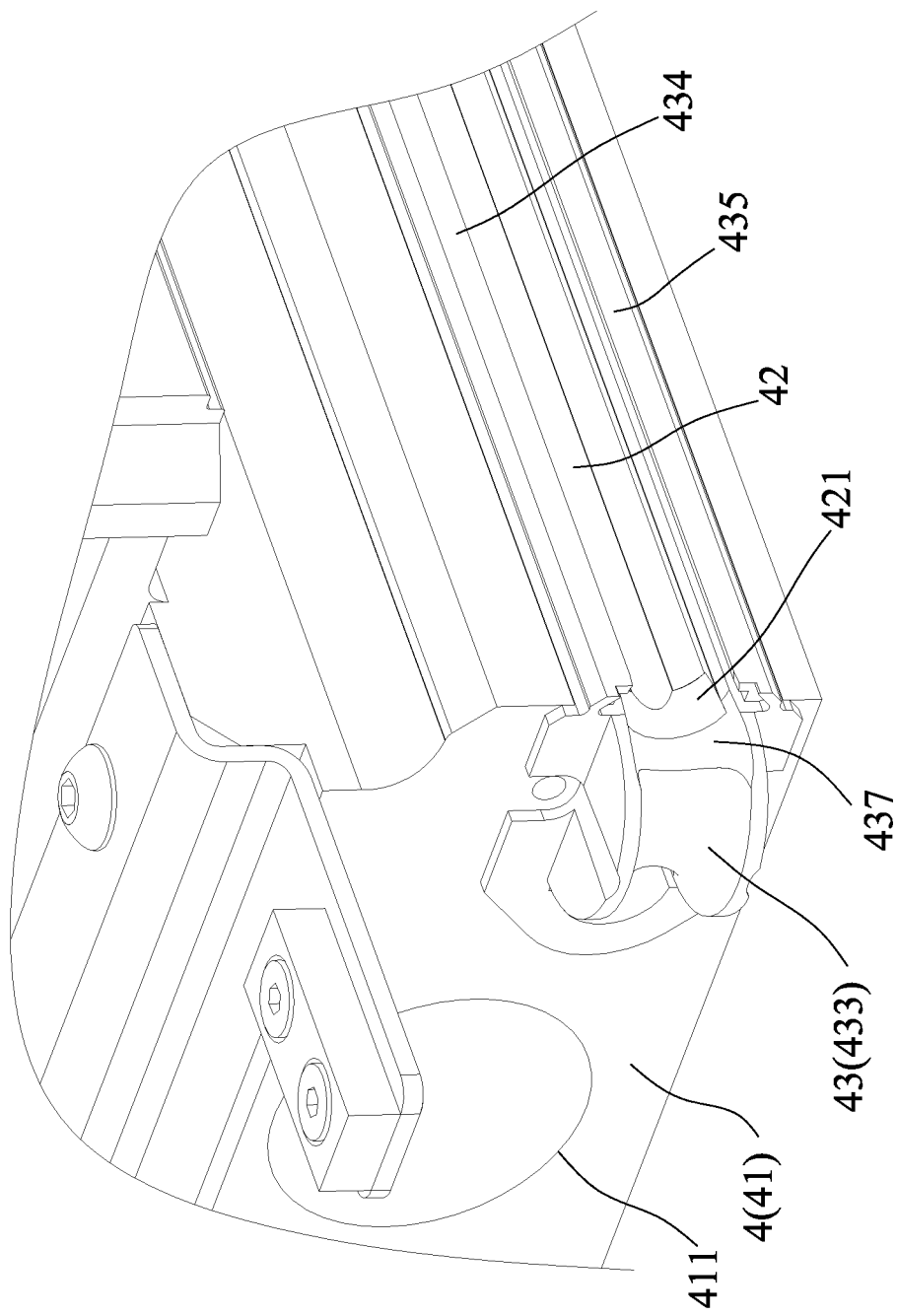
FIG. 10 is an enlarged fragmentary perspective view of the embodiment illustrating a seat body, a seat body rigid rail, and the cyclic track member of the sliding table.

Referring to FIG. 10, each of the turnaround sections 433 of the cyclic track members 43 and one of the seat body rigid rails 42 are chamfered at a junction thereof. In this embodiment, each of the seat body rigid rails 42 has two first chamfered surfaces 421 respectively adjacent to the turnaround sections 433 of one of the cyclic track members 43. Each of the turnaround sections 433 of the cyclic track members 43 has a second chamfered surface 437 adjacent to and cooperating with one of the first chamfered surfaces 421 of one of the seat body rigid rails 42 to form a smoothly curved surface. Therefore, the junction formed at the turnaround section 433 and the respective seat body rigid rail 42 will not hinder the rollers 441 from sliding and rolling, thereby increasing smoothness of operation.

To sum up, because the size of the seat body 41 is relatively large, the seat body 41 made from aluminum not only can reduce weight but also can save fabrication costs. Since the seat body rigid rails 42 need to bear load, they are made from steel to resist wear and tear and to not deform easily. Since each roller belt module 44 has to be guided by the respective cyclic track member 43, each cyclic track member 43 must have a complicated shape. By virtue of each cyclic track member 43 made from a plastic material and overmolded to the seat body 41, fabrication and processing costs can be saved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A sliding table, comprising:
two main rigid rails extending along a lengthwise direction of the sliding table and parallel with each other;
a screw rod extending along the lengthwise direction and disposed between said two main rigid rails; and
a sliding seat including:
a seat body made from a first material and disposed between said two main rigid rails, said seat body having a driving hole through which said screw rod extends, two opposite sides of the seat body, respectively, formed with rail recesses, wherein each of said rail recesses opens, respectively, toward a corresponding one of said two main rigid rails, and two inner cyclic track holes, wherein each of said two inner cyclic track holes is disposed between said driving hole and a corresponding one of said rail recesses;
two seat body rigid rails, wherein each of said two seat body rigid rails is made from a second material harder than the first material, and each of said two seat body rigid rails being, respectively, fixed in a corresponding one of said rail recesses to, respectively, face a corresponding one of said two main rigid rails;
two cyclic track members overmolded to said seat body, each of said two cyclic track members having an outer track section extending along a corresponding one of said rail recesses and further having an inner track section, each inner track section extending within a corresponding one of said two inner cyclic track holes, and two turnaround sections, respectively, disposed at two opposite ends of said outer track section of each of said two cyclic track members, each of said two turnaround sections connecting between one of said two opposite ends of said outer track section and a corresponding one of two opposite ends of said inner track section of each of said two cyclic track members; and
two roller belt modules, each of said two roller belt modules is, respectively, arranged in a corresponding one of said two cyclic track members, each of said two roller belt modules including a belt made of a flexible material and a plurality of rollers held by said belt at predetermined intervals;
wherein, when said seat body moves along said two main rigid rails, each of said two roller belt modules circulates along a corresponding one of said two cyclic track members by sequentially passing a corresponding outer track section, a corresponding one of said two turnaround sections, a corresponding inner track section, and a corresponding one of the other one of said two turnaround sections of a corresponding one of said two cyclic track members;
wherein said rollers of each of said two roller belt modules roll between a corresponding one of said two main rigid rails and a corresponding one of said two seat body rigid rails, and said belt of each of said two roller belt modules slides along said outer track section of a corresponding one of said two cyclic track members;
wherein each of said two cyclic track members is made from a plastic material;
wherein said outer track section of each of said two cyclic track members has a top engagement bar and a bottom engagement bar, said top engagement bar and said bottom engagement bar being, respectively, formed at an upper side and a lower side of a corresponding one of said rail recesses, each of said top and bottom engagement bars being connected between said respective two turnaround sections, wherein each one of said two seat body rigid rails is exposed between said respective top and bottom engagement bars, and said belt of each of said two roller belt modules being in sliding engagement with said top and bottom engagement bars of said outer track section of a corresponding one of said two cyclic track members; and
wherein each of said two seat body rigid rails has two first chamfered surfaces, respectively, adjacent to said two turnaround sections of a corresponding one of said two cyclic track members, and wherein each of said two turnaround sections of each of said two cyclic track members has a second chamfered surface cooperating with a corresponding one of said two first chamfered surfaces of one of said two seat body rigid rails to thereby form a contiguous smoothly-curved surface.

2. The sliding table as claimed in claim 1, wherein each belt of each of said two roller belt modules has top and bottom longitudinal strip parts, a plurality of spacer parts disposed at predetermined intervals and connected between said top and bottom longitudinal strip parts, and a plurality of ball cavities, wherein each ball cavity is defined between two adjacent said spacer parts and between a corresponding one of said top and bottom longitudinal strip parts to receive one of said plurality of rollers.

3. The sliding table as claimed in claim 1, further comprising a base including two end members spaced apart from each other along the lengthwise direction, and a main body connected between said end members and extending along the lengthwise direction, said end members and said main body cooperating with each other to define a main body space opening upwardly, said main rigid rails being mounted within said main body space and connected between said end members, said screw rod being connected between said end members.

4. The sliding table as claimed in claim 1, further comprising a top cover covering a top of said seat body.

5. The sliding table as claimed in claim 1, wherein said first material is aluminum, and said second material is steel.

6. The sliding table as claimed in claim 5, wherein said seat body is an extruded aluminum body.

7. The sliding table as claimed in claim 1, wherein:
   said inner track section of each of said two cyclic track members is formed as a tube and has an oil injecting hole extending radially through an inner surface and an outer surface of said tube; and
   said seat body of said sliding seat further has two oil injecting passages, each of said two oil injecting passages, respectively, extending to a corresponding one of said two inner cyclic track holes from a top side of said seat body and, respectively, communicating with a corresponding oil injecting hole.

8. The sliding table as claimed in claim 1, wherein said sliding seat further includes four track covers, each of said four track covers, respectively, covering a corresponding one of said turnaround sections of a corresponding one of said two cyclic track members to prevent escape of said rollers from said respective belts of a corresponding one of said roller belt modules.

\* \* \* \* \*